United States Patent [19]
Kim

[11] Patent Number: 6,081,313
[45] Date of Patent: *Jun. 27, 2000

[54] LIQUID CRYSTAL DISPLAY DEVICE AND A METHOD FOR FABRICATING THEREOF

[75] Inventor: Wan Soo Kim, Kyungki-Do, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/622,876

[22] Filed: Mar. 29, 1996

[30] Foreign Application Priority Data

Oct. 2, 1995 [KR] Rep. of Korea .................. 95-33690

[51] Int. Cl.[7] .................................................. G02F 1/1337
[52] U.S. Cl. ........................... 349/129; 349/123; 349/124; 349/132
[58] Field of Search ................................. 349/124, 126, 349/129, 132, 123

[56] References Cited

U.S. PATENT DOCUMENTS

| | | | |
|---|---|---|---|
| 4,796,979 | 1/1989 | Tsuboyama | 349/129 |
| 5,122,440 | 6/1992 | Chien | 430/315 |
| 5,280,375 | 1/1994 | Tsuda et al. | 349/124 |
| 5,321,537 | 6/1994 | Okada et al. | 349/129 |
| 5,473,455 | 12/1995 | Koike et al. | 349/124 |
| 5,477,360 | 12/1995 | Sunohara et al. | 349/132 |
| 5,612,802 | 3/1997 | Okada et al. | 349/129 |
| 5,623,354 | 4/1997 | Lien et al. | 349/124 |
| 5,652,634 | 7/1997 | Hirata et al. | 349/129 |
| 5,850,274 | 12/1998 | Shin et al. | 349/129 |

*Primary Examiner*—William L. Sikes
*Assistant Examiner*—Tarifur R. Chowdhury
*Attorney, Agent, or Firm*—Finnegan, Henderson, Farabow, Garrett & Dunner, L.L.P.

[57] ABSTRACT

A liquid crystal cell is fabricated by successively coating on a substrate a first alignment layer, which includes material substantially impervious to ultraviolet irradiation and a second alignment layer which includes a photosensitive material which is insoluble if not exposed to ultraviolet light, but readily dissolved in a developing solution after exposure. Portions of the first and second alignment layers corresponding to an inner space of a cell are alternately exposed so that different alignment controlling forces are respectively obtained for both alignment layers after rubbing.

18 Claims, 7 Drawing Sheets

LIQUID CRYSTAL DISPLAY DEVICE AND A METHOD FOR FABRICATING THEREOF

BACKGROUND OF THE INVENTION

The present invention relates to a liquid crystal display, and particularly to a method for fabricating a liquid crystal cell in which a photoresist coating and removing process is eliminated so that number of the fabrication process steps may be minimized.

The transmittance of a twisted nematic(TN) cell in each grey level is dependent on viewing angle. In particular, the transmittance in the up and down directions is asymmetric, while it is symmetric in the left and right directions. Thus, there is a problem in that the image in the up and down directions may be reversed and the viewing angle becomes narrow. This angular dependence in the up and down directions is caused by the electrically induced liquid crystal(LC) director configuration.

To solve this angular dependence problem, therefore, a two-domain twisted nematic(TDTN) cell has been introduced. FIG. 1 is a sectional view of the TDTN cell showing each pixel having two director configuration domains in which the pre-tilted directions are in opposing directions. Applying a grey level voltage to this cell, the LC directors in two domains are tilted in opposite directions so that the transmittance in the up and down directions is compensated and viewing angle characteristics are improved.

In the above-described TDTN cell, however, there is a problem in that polyimide used for an alignment layer is affected by the rubbing process because the rubbing is carried out twice: once with a photoresist exposing selected portions to have a first, then a second time with the PR removed to form a second pretilt angle in the opposite direction in portions previously covered by the PR. Thus, the pretilt angles in opposing directions in two domains are provided.

In order to solve the angular dependence problem, a domain divided twisted nematic(DDTN) cell is also used. In the DDTN cell, alignment layers are coated on the upper and lower substrates of the cell, as shown in FIG. 2.

A first alignment layer 7 is exposed to inner space of the cell in one domain of the upper substrate, while a second alignment layer 8 is exposed in one neighboring domain. In addition, the first alignment layer 7 is exposed to the inner space of the cell in a portion of the domain of the lower substrate facing the domain of the upper substrate in which the second alignment is exposed. Further, second alignment layer 8 is exposed in a neighboring domain facing the domain of the upper substrate in which the first alignment layer is exposed. Since the first and second alignment layers consist of two materials having different pretilt angles, the average pretilt angles of the left and right domains, after rubbing, are in opposite directions, so that the transmittance is symmetric and the viewing angle is compensated.

Referring to FIGS. 3A~3H, the fabrication process or the DDTN cell is explained in detail as follow.

First, as shown in FIG. 3A, a transparent indium tin oxide(ITO) electrode layer 3 is coated on the substrate 1. Thereafter, the first alignment layer 7 and the second alignment layer 8 are successively formed on the ITO layer 3(see FIGS. 3B and 3C). The photoresist layer 10 is also coated on the second alignment layer 8 to first expose the first alignment layer 7 and the second alignment layer 8 to the inner space of the cell, as shown in FIG. 3D.

As shown in FIGS. 3E and 3F, using the mask 12 having opening divided into micro units, ultraviolet(UV) light is irradiated on a certain part of micro unit of the second alignment layer 8, and thereafter dissolved with a developing solution. Here, the second alignment layer 8 includes material soluble in a developing solution, while the first alignment layer 7 includes material insoluble in the developing solution, such that the first alignment layer 7 is exposed to the inner space of the cell after the exposed portion of the second alignment layer 8 has been dissolved away.

After the photoresist layer 10 on the second alignment layer 8 is removed to form the desired structure, rubbing is carried out on the first alignment layer 7 and the second alignment layer 8 which have been in exposed alternate succession, sa shown in FIGS. 3G and 3H. Thus the alignment controlling force is provided in the micro regions of the first alignment layer 7 and the second alignment layer 8 which were exposed to the inner space of the cell.

In the conventional method for fabricating the DDTN cell, however, there is a problem that an excessive number of process steps are required to fabricate the cell.

SUMMARY OF THE INVENTION

It is an object of the present invention to provide a method for fabricating a liquid crystal cell in which the number of process steps can be reduced.

In order to achieve this object, the present invention comprises the steps of forming an electrode on a substrate, coating a first alignment layer on the electrode, coating a second alignment layer on the first alignment layer, irradiating ultraviolet light on the second alignment layer, removing the exposed second alignment layer with a developing solution, and rubbing the whole substrate again.

The first alignment layer includes material insoluble in the developing solution and the second alignment layer includes material which is soluble in the developing solution after exposure to ultraviolet light.

DETAILED DESCRIPTION OF THE INVENTION

The liquid crystal cell according to the present invention is a DDTN cell in which viewing angle characteristics is improved. One of the important features of the DDTN cell in accordance with the present invention is that the first and second alignment layers include two materials, respectively, having two different pretilt angles. Preferably, the first alignment layer has a low pretilt angle. Accordingly, the liquid crystal molecules are tilted differently in the first alignment layer than the second alignment layer after rubbing the first and second alignment layers have been rubbed separately.

Since the pretilt angles described above are incorporated into the present invention, the liquid crystal molecules are tilted, and the viewing angle characteristics, especially in the up and down directions, are improved by averaging the varying transmittance in accordance with the viewing angle.

Referring now to FIGS. 4A–4F, the process for fabricating a DDTN cell in accordance with the present invention is explained in detail as follows.

Figure 1:
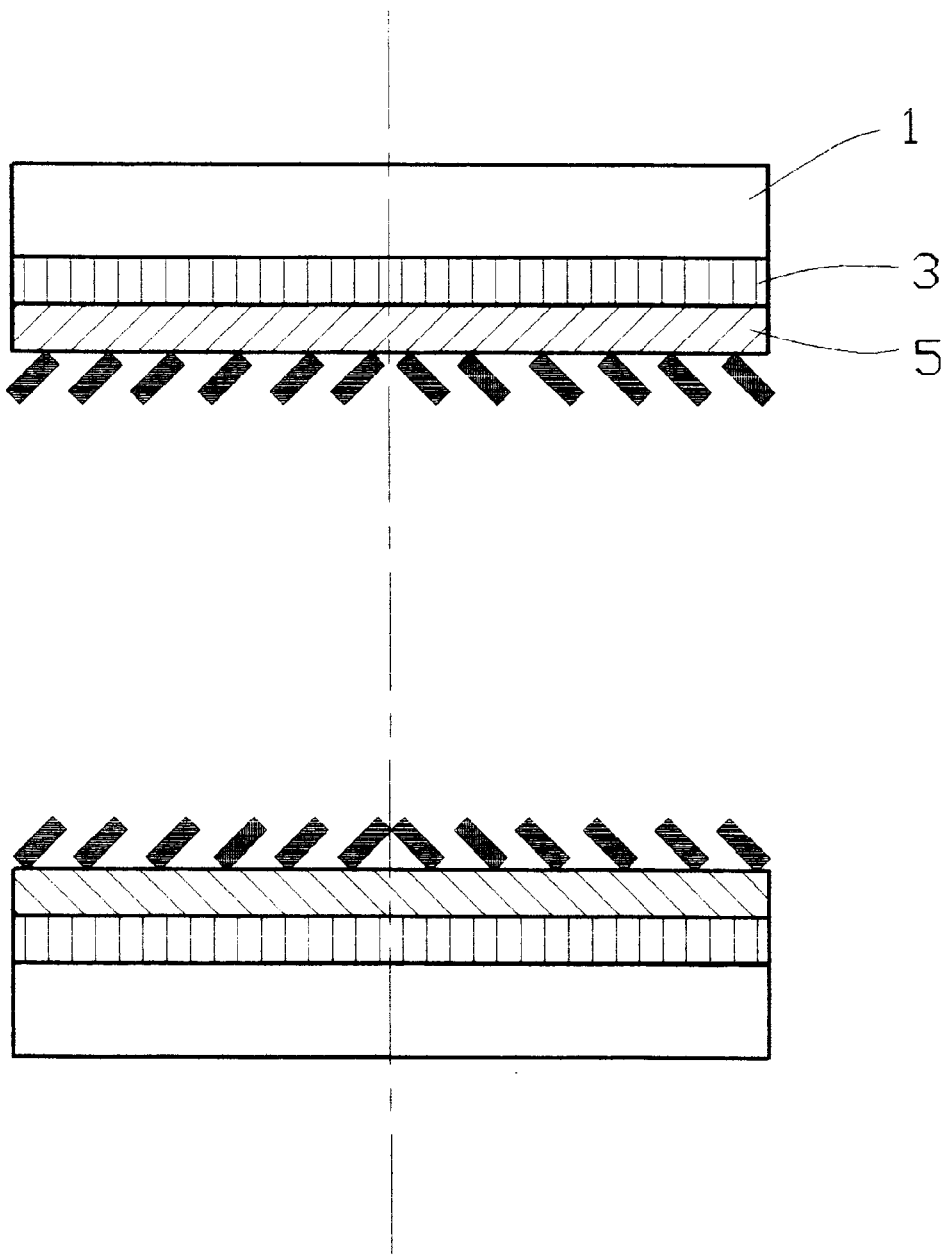
FIG. 1 is a sectional view of two-domain twisted nematic liquid crystal cell.
Figure 2:
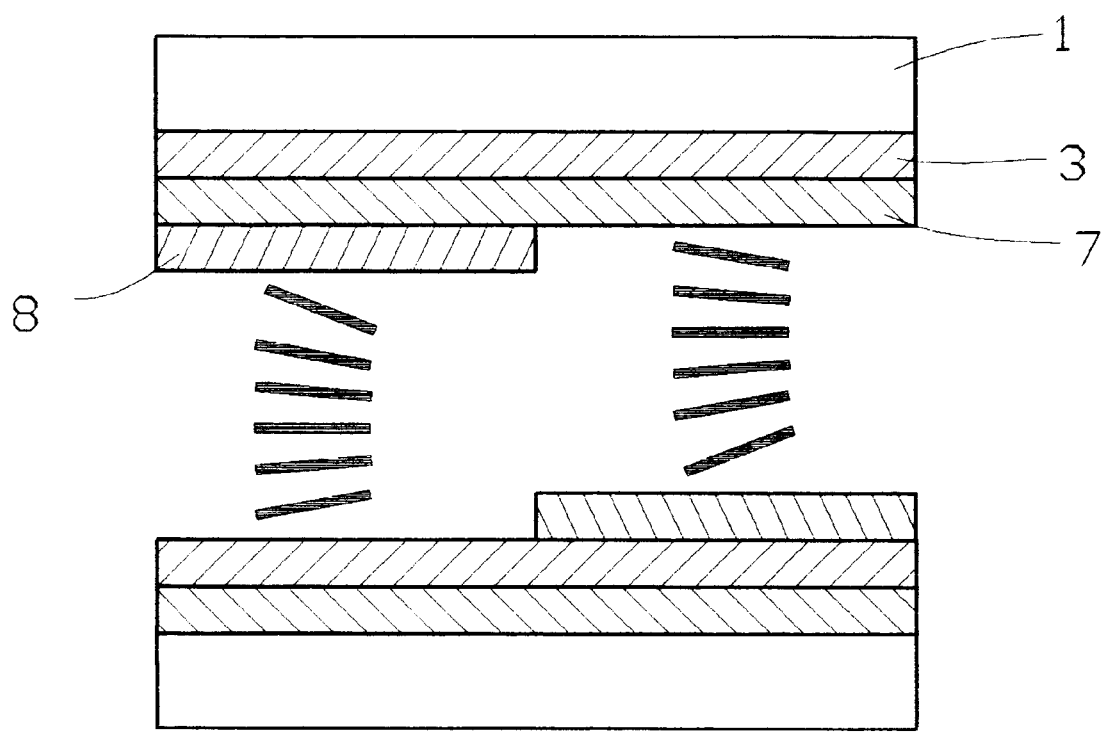
FIG. 2 is a sectional view of domain-divided twisted nematic liquid crystal cell.
Figure 3A:
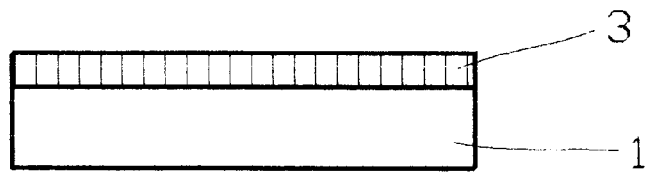
FIGS. 3A~3H are sectional views showing the conventional process for fabricating a liquid crystal cell.
Figure 3B:
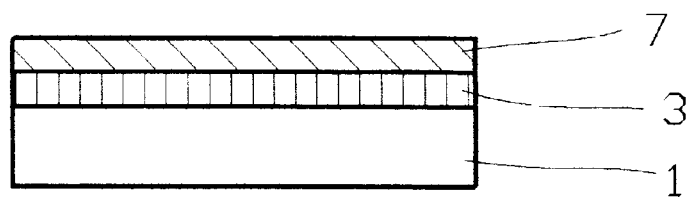
Figure 3C:
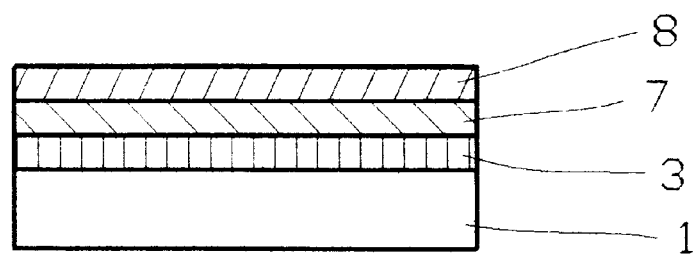
Figure 3D:
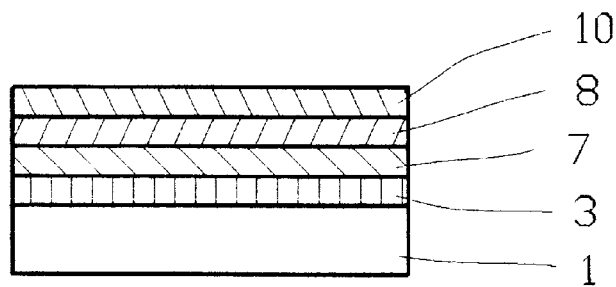
Figure 3E:
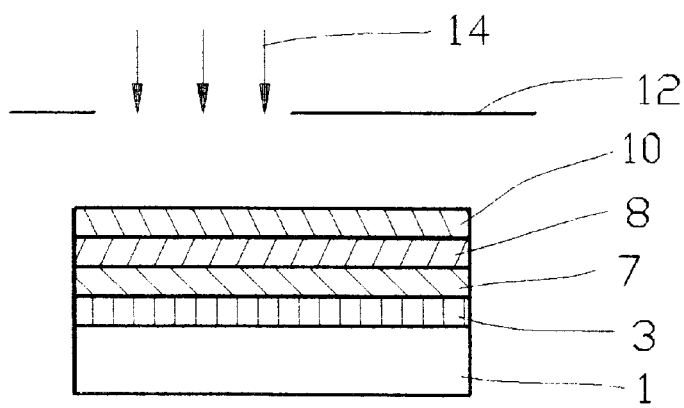
Figure 3F:
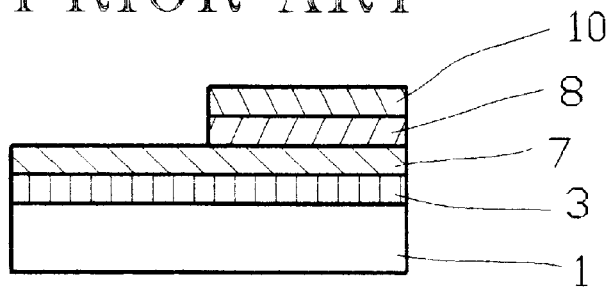
Figure 3G:
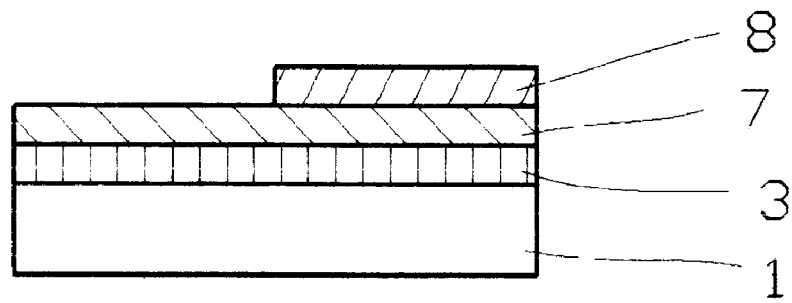
Figure 3H:
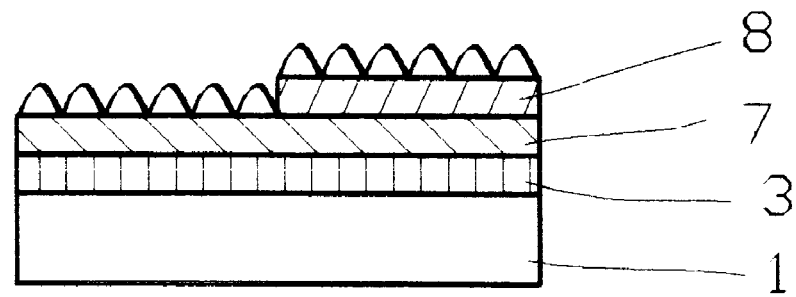
Figure 4A:
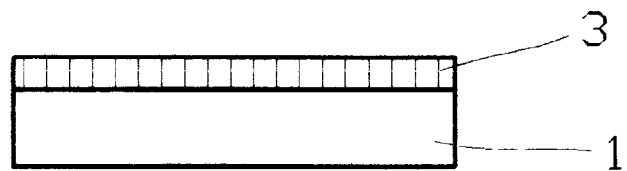
FIGS. 4A~4F are sectional views showing the process for fabricating a liquid crystal cell according to the present invention.
Figure 4B:
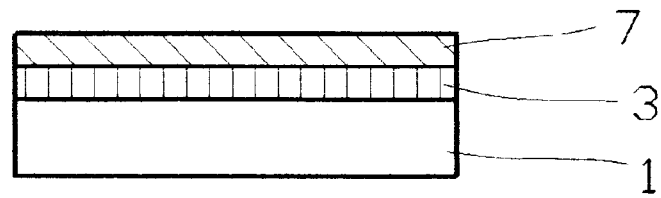
Figure 4C:
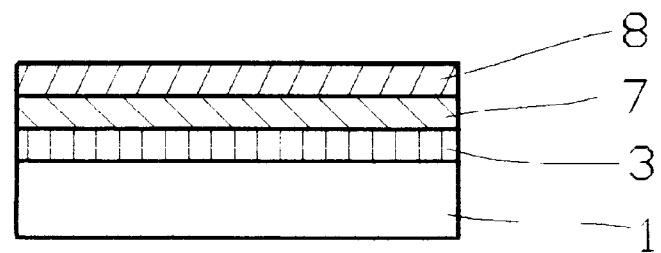

As shown in FIGS. 4A and 4B, ITO layer 3 having a relatively small wavelength dispersion is coated on the substrate 1. Next, the first alignment layer 7, which preferably includes polyimide material resistant to the developing solution, is coated on ITO layer 3. Thereafter, the second alignment layer 8 is coated on the first alignment layer 7, as shown in FIG. 4C. The second alignment layer 8 preferably includes photosensitive polyimide material which is insoluble in the developing solution if not exposed to UV, but soluble in the developing solution after UV exposure.

Figure 4D:
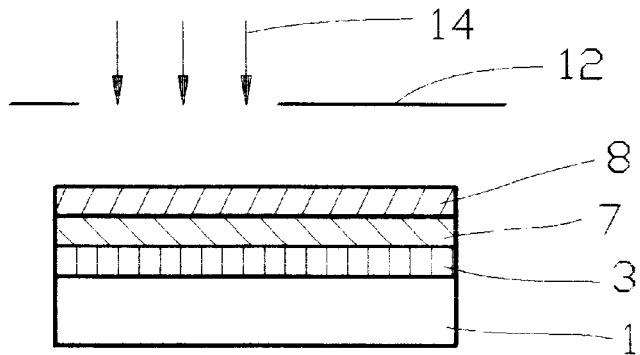
Figure 4E:
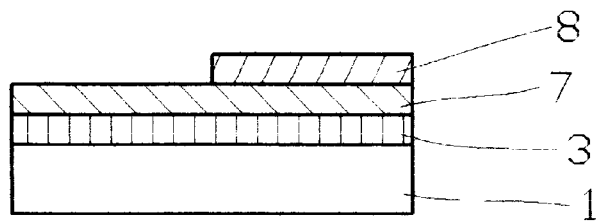
Figure 4F:
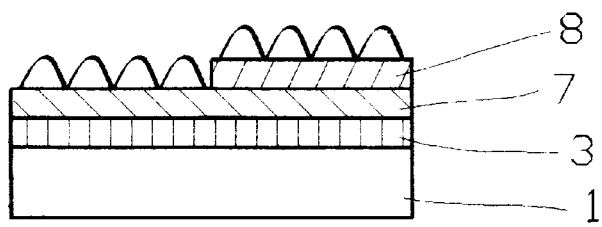

Furthermore, as shown in FIGS. 4D and 4E, UV light is irradiated only on a certain part of the second alignment layer 8 using photomask 12. The exposed portion of the second alignment 8 is then removed so that the first alignment layer 7 is exposed to an inner space of the cell in one domain of the substrate 1 and the second alignment layer 8 is exposed in a neighboring domain. By rubbing the first alignment layer 7 and second alignment 8, which have been alternately exposed as shown in FIG. 4F, the alignment controlling force in the first alignment layer 7 and the second alignment layer 8 are different, and the pretilt angle caused by each alignment controlling force in the first alignment layer 7 and the second alignment layer 8 are also different.

In above-described DDTN cell, each alignment layer coated on the substrate consists of two materials having different pretilt angles, so that different alignment controlling forces may be obtained for each domain of the cell by rubbing the substrates on which the first alignment layer and the second alignment layer are coated. In addition, in the process for fabricating the liquid crystal cell according to present invention, since the process for coating and removing the photoresist layer is eliminated, the number of fabrication steps is reduced, as well as the production cost.

Having described the present invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A method for fabricating a liquid crystal cell, comprising the steps of:

forming an electrode on a substrate;

coating a first alignment layer on said electrode;

coating a second alignment layer having a surface on said first alignment layer;

irradiating ultraviolet light on the surface of a first portion of said second alignment layer;

removing said first portion of said second alignment layer, thereby exposing a portion of said first alignment layer and leaving a second portion of said second alignment layer on said first alignment layer; and rubbing said exposed portion of said first alignment layer and the surface of said second portion of said second alignment layer, which obtains an alignment controlling force of said exposed portion of said first alignment layer that is different than that of said second portion of said second alignment layer.

2. The method for fabricating a liquid crystal cell in accordance with claim 1, wherein said first alignment layer includes material which is substantially insoluble in a developing solution.

3. The method for fabricating a liquid crystal cell in accordance with claim 1, wherein said second alignment layer includes photosensitive material which is substantially insoluble in a developing solution if unexposed to ultraviolet radiation, and substantially soluble in said developing solution if exposed to ultraviolet radiation.

4. The method for fabricating a liquid crystal cell in accordance with claim 1, wherein said first alignment layer includes a polyimide material.

5. The method for fabricating a liquid crystal cell in accordance with claim 1, wherein said second alignment layer includes a polyimide material.

6. The method for fabricating a liquid crystal cell in accordance with claim 1, wherein said first portion of said second alignment layer is soluble in a developing solution, and said second portion of said second alignment layer is insoluble in said developing solution.

7. The method for fabricating a liquid crystal cell in accordance with claim 1, wherein said removing step further comprises the step of dissolving said first portion of said second alignment layer.

8. A method for fabricating a liquid crystal cell, comprising the steps of:

depositing a first layer including a material adapted to provide a first pretilt angle for liquid crystal molecules;

depositing a second layer having a surface and including a material adapted to provide a second pretilt angle for said liquid crystal molecules over said first layer;

irradiating light on the surface of a first portion of said second layer;

removing said first portion of said second layer, thereby leaving a second portion of said second layer on said first layer and exposing a portion of said first layer; and rubbing said exposed portion of said first layer and the surface of said second portion of said second layer, which obtains an alignment controlling force in said exposed portion of said first layer that is different than that of said second portion of said second layer.

9. The method for fabricating a liquid crystal cell in accordance with claim 8, further comprising a step of depositing an electrode layer on a substrate, and said step of depositing said first layer includes a step of depositing said first layer on said electrode.

10. The method for fabricating a liquid crystal cell in accordance with claim 8, wherein said light is ultraviolet light.

11. The method for fabricating a liquid crystal cell in accordance with claim 8, wherein said removing step includes a step of subjecting said second layer to a developing solution.

12. The method for fabricating a liquid crystal cell in accordance with claim 8, wherein said material included in said first layer is substantially insoluble in a developing solution after exposure to ultraviolet light, and said material included in said second layer is substantially insoluble in said developing solution if unexposed to ultraviolet light and substantially soluble in said developing solution if exposed to ultraviolet light.

13. The method for fabricating a liquid crystal cell in accordance with claim 8, wherein said first and second pretilt angles are different from each other.

14. The method for fabricating a liquid crystal cell in accordance with claim 8, wherein said first pretilt angle is less than said second pretilt angle.

15. A liquid crystal display device, comprising:

a substrate;

a first alignment layer adapted to provide a first pretilt angle for liquid crystal molecules on said substrate, said first alignment layer providing a first alignment controlling force to said liquid crystal molecules; and a second alignment layer formed on a portion of said first alignment layer to provide a second pretilt angle for said liquid crystal molecules, said second alignment layer including a photosensitive material and providing a second alignment controlling force to said liquid crystal molecules that is different than said first alignment controlling force.

16. The liquid crystal display device in accordance with claim 15, wherein said photosensitive material is rendered soluble in a solution upon exposure to light.

17. The liquid crystal display device in accordance with claim 16, wherein said solution is a developing solution.

18. The liquid crystal display device in accordance with claim 16, wherein said light includes ultraviolet light.

* * * * *